United States Patent [19]

Berthold, III

[11] 4,262,992

[45] Apr. 21, 1981

[54] VARIABLE INTEGRATED OPTICAL LOGIC ELEMENT

[75] Inventor: John W. Berthold, III, College Park, Md.

[73] Assignee: The United States of America as represented by the Director of the National Security Agency, Washington, D.C.

[21] Appl. No.: 31,257

[22] Filed: Apr. 18, 1979

[51] Int. Cl.³ .............................................. G02B 5/14
[52] U.S. Cl. ............................ 350/96.14; 350/96.13; 350/355
[58] Field of Search ............... 350/96.11, 96.12, 96.13, 350/96.14, 96.15, 355, 356

[56] References Cited

U.S. PATENT DOCUMENTS

| | | | |
|---|---|---|---|
| 3,781,081 | 12/1973 | Rokos | 350/96.14 |
| 3,849,740 | 11/1974 | Brandt | 350/96.12 X |
| 3,909,108 | 9/1975 | Taylor | 350/96.14 |
| 3,995,311 | 11/1976 | Taylor | 350/96.15 |
| 4,008,947 | 2/1977 | Baües et al. | 350/96.14 |
| 4,012,113 | 3/1977 | Kogelnik et al. | 350/96.13 |
| 4,070,092 | 1/1978 | Burns | 350/96.14 |
| 4,070,094 | 1/1978 | Martin | 350/96.14 |
| 4,087,159 | 5/1978 | Ulrich | 350/96.12 |
| 4,128,300 | 12/1978 | Stotts et al. | 350/96.14 |
| 4,130,342 | 12/1978 | McMahon | 350/96.14 |

OTHER PUBLICATIONS

Glass et al., "Optical Gating and Logic with Pyroelectric Crystals", Appl. Phys. Ltrs., vol. 24, No. 2, Jan. 1974, pp. 81-82.
Ramaswamy et al., "A Phased, Optical, Coupler-Pair Switch", Bell Syst. Tech. Journ., vol. 55, No. 6, Jul.-Aug. 1976, pp. 767-775.
"Integrated Optical Device is a 'Jack of all Trades'", Optical Spectra, vol. 12, No. 10, Oct. 1978, pp. 34-36.

Primary Examiner—John K. Corbin
Assistant Examiner—John D. Lee
Attorney, Agent, or Firm—John R. Utermohle; Thomas O. Maser; Barry N. Young

[57] ABSTRACT

A variable integrated optical logic element, formed on a substrate of electro-optic material, capable of being controlled to perform the six basic logic operations AND, OR, EXCLUSIVE OR, NAND, NOR and EXCLUSIVE NOR. The optical logic element comprises a plurality of single-mode optical waveguides which form a group of parallel and series equal-arm interferometers. The optical logic element operates on the principle of constructive and destructive interference between light beams. Voltage means are provided for varying the index of refraction of certain of the optical waveguides, to produce relative phase differences in the light energy propagating therein. By inducing phase shifts in the light energy propagating in appropriate waveguides, each of the six basic logic operations can be performed. Also disclosed is an electrically passive, phase-sensitive optical coupler, which is used for switching light energy between waveguides. The switching operation performed by the phase-sensitive coupler is a function of the presence or absence of and the relative phase differences between the light energy input to the coupler.

12 Claims, 4 Drawing Figures

VARIABLE INTEGRATED OPTICAL LOGIC ELEMENT

BACKGROUND OF THE INVENTION

The invention relates generally to integrated optical elements, and more particularly to optical logic elements capable of being controlled to produce a variety of logic operations.

The advancing state of the art of integrated optics and the availability of small, relatively inexpensive integrated optical elements, makes optics an attractive alternative to certain processing operations previously performed using electronic circuitry. One reason for this attractiveness is that the large bandwidths available with optical devices permit high speed operation which is necessary for processing high data rate signals in real-time. Theoretically achievable speeds at optical frequencies are in the order of 1 to 10 picoseconds. This speed is significantly faster than that obtainable with electronic logic gates, whose ultimate switching speed will probably be limited by capacitance to about 300 picoseconds. Such potential speeds make optical logic very desirable for certain high speed signal processing applications. Other advantages of optical elements include their freedom from cross talk and intermodulation which are present in electronic devices, and their relative insensitivity to electromagnetic interference effects.

Optical devices which utilize electrical switching and are capable of performing fixed logic operations such as OR or AND have been demonstrated. Such devices may typically operate on the principle of constructive or destructive interference between two or more light beams, i.e., two light beams in-phase with each other which are added together reinforce to produce a light beam having an amplitude equal to the sum of the amplitudes, while two light beams of opposite phase cancel one another, the energy being redistributed to regions beyond the area of overlap such that the waveguide propagating this energy is inhibited. To perform a processing operation, it is typically necessary to interconnect a large number of different logic gates together, generally in a pipeline configuration, so that a specified sequence of particular logic operations is performed on the input signals. When fixed function logic gates are used, the processing operation is fixed and determined by the particular types and interconnection of the gates. To vary the processing operation, it is necessary to vary either the types of gates or their interconnection.

In some applications, it is desirable to be able to dynamically vary the processing operation. With fixed function logic gates, this requires that switching means be provided internal to the logic configuration so that signals can be routed to different gates. The flexibility of such a processor is, therefore, natually limited to the flexibility available in the switching means, the availability of gates to perform necessary logic operations and the ingenuity of the designer. In optical processors which depend upon the interference between light beams to perform logic operations, the necessity of precisely controlling the phase of the optical signals input to the logic gates presents an added problem in achieving flexibility, where the light beams must be capable of being switched to a plurality of different locations in the optical logic.

In addition to the added hardware required for providing switching between logic gates, a further disadvantage of using fixed function logic gates where flexibility is desired, is the necessity of providing a large number of the different types of gates which may be required to achieve the desired degree of flexibility. This increases the size and cost of the processor, adds to its complexity and results in inefficient utilization of hardware. These problems can be offset to some extent by utilizing logic gates which are capable of performing more than one logic function, thus reducing the number of logic gates required.

An optical logic element capable of performing several optical operations simultaneously is disclosed in U.S. Pat. No. 4,128,300 to Stotts et al. The optical devices therein disclosed provide several different outputs from the optical element, which represent different logic operations, e.g., AND, EXCLUSIVE OR, NOR, etc., and simultaneously functions as several different logic gates. The optical devices operate by coupling to different optical propagating modes in a multi-mode optical waveguide. The various logic functions are obtained by coupling to different optical modes, using output waveguides which are appropriately sized to propagate the specific mode desired. Each separate logic function requires a separate output from the logic element. In essence, the devices disclosed are mode selective switches. By launching particular modes in the multi-mode waveguide, outputs will be obtained from the appropriate waveguides capable of coupling to the various modes.

One of the difficulties with the devices disclosed in the aforementioned patent, is that in order to interconnect a number of such logic elements together, means must be provided for converting between high-order modes output from one device and the low-order modes required for input into subsequent logic devices. Furthermore, the devices disclosed do not permit dynamic processing, since the logic operations performed by the gates can not be varied, except through the use of complicated switching schemes, as previously described.

A further and more important disadvantage of previous optical logic gates is that they depend upon the switching of electrical control voltages, in coincidence with the presence or absence of inputs to the gates, in order to perform a logic operation. This is necessary in order to change the relative optical phases in the appropriate waveguides to obtain the logic function. Thus, in prior optical logic gates, the speed at which a given logic operation can be performed is limited not by the inherent optical bandwidth, but rather by the electrical switching speed, which is determined primarily by the control electrode capacitance.

The present invention does not require control electrode voltage switching to perform logic operations. Logic operations result from the constructive and destructive interference between light beams which propagate through the optical logic element. Control electrodes are utilized only to "configure" the logic element to perform a given logic function, i.e., AND, OR, etc., by adjusting the optical lengths of predetermined paths to a "fixed" length. Once the logic element is configured for a particular logic function by the application voltages to certain control electrodes, the voltages remain fixed until it is desired to change the logic function. Therefore, the rate at which logic operations can be performed is determined by the optical bandwidth of the optical device, not the speed at which the control electrodes can be switched.

SUMMARY OF THE INVENTION

It is desirable to provide optical logic elements which overcome the aforesaid difficulties and it is to this end that the present invention is directed.

Accordingly, it is an object of the invention to provide a new and improved optical logic element which is capable of dynamically altering its operation in response to applied control signals.

It is a further object of the invention to provide a single optical element which is capable of being varied to perform any of the six basic binary logic operations AND, OR, EXCLUSIVE OR, NAND, NOR, and EXCLUSIVE NOR.

It is an advantage of the invention that there is provided a single standard logic element which is capable of performing any of the six logic operations in accordance with the application of control signals. This facilitates the interconnection of a number of such logic elements to perform a desired processing operation. Furthermore, since the operation of the logic elements can be altered by the application of control signals, the devices permit the construction of processors which are capable of dynamic processing operations, i.e., changing logic functions in accordance with the application of control signals.

It is an additional advantage of the invention that no control electrode voltage switching is required in order to perform logic functions. Thus, the speed at which logic operations can be performed is determined only by the pulse widths of the input optical signals and the propagation delay between input and output, and not by the electrical switching time.

According to the invention there is provided an optical logic element wherein two or more single-mode input optical waveguides diverge into a plurality of equal optical length waveguide paths, which paths reconverge to a single output path for providing an output beam representative of the logic function performed. Included within the equal optical length waveguide paths are passive switching means for switching light from one path to another depending upon the presence or the absence of and the relative phase between the inputs to the switching means, combining means for combining certain paths together, and control means for varying the optical length of one or more of the equal-length optical waveguide paths such that the phase of the signals propagating therein may be shifted relative to the phase of signals in other paths. The logic operation performed by the optical logic element is a function of the paths whose optical lengths are changed.

DESCRIPTION OF THE PREFERRED EMBODIMENT

Figure 1:
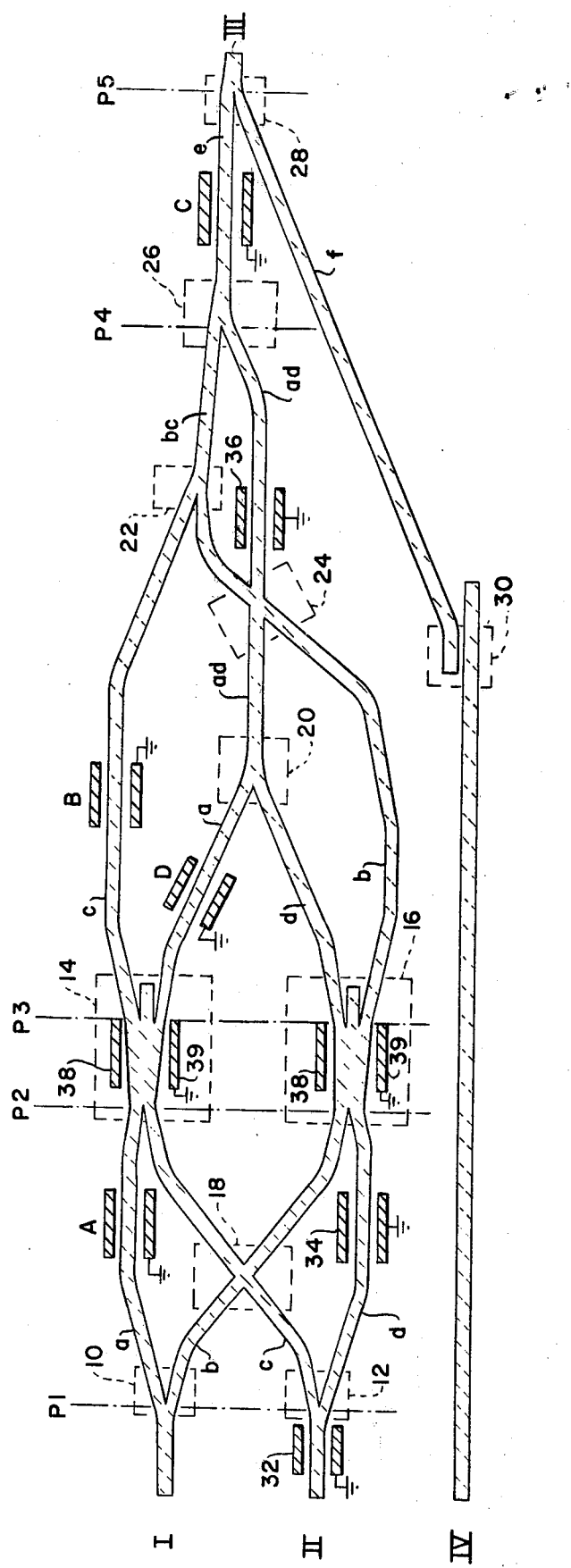
FIG. 1 is an illustration of the variable optical logic element provided by the invention which is capable of performing multi-logic operations.

Referring to FIG. 1, there is illustrated a preferred embodiment of the optical logic element provided by the invention. Advantageously, the device of FIG. 1 may be placed onto a substrate of suitable material, such as lithium niobate, which supports the various optical waveguides and components illustrated in FIG. 1, to form an integrated optical logic element. The various waveguides and optical components illustrated in FIG. 1 may advantageously be formed, as is wellknown by those skilled in the art, by the deposition and diffusion of titanium into the lithium niobate substrate, to form electro-optic waveguides and components. Essentially, the variable integrated optical logic element of FIG. 1 comprises a group of parallel and series equal-arm interferometers and operates on the principle of constructive and destructive interference between light beams.

Referring to FIG. 1, two single-mode input waveguides I and II are provided for inputting equal amplitude, coherent, in-phase light beams which propagate as a lowest order TE or TM wave throughout the logic element, except at the crosschannel couplers 14, 16, as will be explained hereinafter. The input light beams in guides I and II are split in plane P1 by 3dB power dividers 10, 12 into two waveguide paths from each power divider. Each waveguide propagates singlemode energy of one-half of the power input into their respective power dividers. One input waveguide a from power divider 10 is input to a cross-channel single-mode to singlemode coupler 14 at plane P2. The second output b from power divider 10 is supplied to a second cross-channel singlemode to single-mode coupler 16 through a passive crossover 18. A second input c is supplied to cross-channel coupler 14 from power divider 12 through passive crossover 18. The second output d from power divider 12 is input to crosschannel coupler 16.

The operation of cross-channel couplers 14, 16 will be explained in detail hereinafter. However, it is sufficient to note at this time that the operation of these couplers is such that light energy entering the upper input of coupler 14 on guide a exits coupler 14 on the lower guide, a, while energy entering coupler 14 on the lower guide c exits coupler 14 on the upper guide designated c. The outputs a and d from couplers 14 and 16, respectively, are combined in a power combiner 20 into a single output guide ad. Assuming the power of the light beams propagating in guides a and d is the same and that the light beams are in-phase, the power output from combiner 20 in guide ad is equal to the sum of the power input to combiner 20 on guides a and d.

Similarly, outputs c and b from couplers 14 and 16, respectively, are combined in power combiner 22 into a single-mode guide bc. A second passive crossover network 24 is provided to permit outputs b from coupler 16 to cross guide ad. Waveguides bc and ad are then combined in plane P4 in power combiner 26 into single-mode waveguide e. Waveguide e is then combined with the output guide f from a switch 30 in power combiner 28 into a single output waveguide III, which is the output of the logic element. Switch 30 permits light propagating in waveguide IV to be coupled into guide f and combined with the output from guide e for the negation logic functions, as will be explained hereinafter.

The lengths of the optical paths between planes P1 and P2 are equal, such that if coherent in-phase optical beams are present at both waveguide inputs I and II, the light amplitudes at plane P2 input to couplers 14 and 16 from waveguides a and c, and b and d are in-phase and equal. Accordingly, in plane P2, light beams propagating in waveguides a and c combine and reinforce to provide optical power equal to the sum of the input power to coupler 14. Similarly, light beams propagating in guides b and d combine to provide optical power equal to the sum of the power at the inputs to coupler 16.

In similar fashion, the paths between planes P3 and P4 are of equal optical lengths such that light beams leaving couplers 14 and 16 on waveguide paths a, b, c and d arrive in plane P4 in-phase at the input to power combiner 26. Also, light arriving at the input to power combiner 28 from guides e and f are in-phase.

Between planes P1 and P2, disposed adjacent to and on either side of waveguide path a are a pair of control electrodes A, one of which is grounded and the other of which is connected to a DC voltage source, not illustrated. When a voltage potential is induced across the electrodes, an electric field is created which changes the index of refraction of the electro-optic material of waveguide a between the two electrodes. This change in refractive index of waveguide a effectively varies its optical length and causes a phase shift in the light beam propagating therethrough, as is well-known to those skilled in the art. By properly adjusting the magnitude of the electric field, it is possible to cause the light beam propagating in guide a to arrive in plane P2 $\pi$ out of phase with the light beam propagating in guide c.

Likewise, between planes P3 and P4, there are provided pairs of control electrodes B and D disposed on either side of and adjacent to outputs c and a, respectively, from coupler 14. Electrodes B are used to cause a $\pi$ phase shift between the light energy propagating in guides c anc b at the input to power combiner 22. Similarly, electrodes D provide for a $\pi$ phase shift between the light beams propagating in guides a and d at the input to power combiner 20.

An additional set of control electrodes C are provided adjacent to guide e between planes P4 and P5. These electrodes C permit a $\pi$ phase shift of the light propagating in the guide e such that the light in plane P5 is $\pi$ out of phase with the light in guide f, or in-phase with the input light in plane P1. Thus the light output from the logic element will be in-phase with its inputs.

As will be explained hereinafter, by proper control of combinations of electrodes A-D, the optical logic element illustrated in FIG. 1 can perform the six basic binary logic operations AND, OR, EXCLUSIVE OR, NAND, NOR and EXCLUSIVE NOR.

In addition to control electrodes A-D, pairs of trimmer electrodes 32, 34 and 36 may be provided on input path II, guide d between planes P1 and P2, and on guide ad between planes P3 and P4. Electrodes 32-36 are used to vary the index of refraction of their respective guides in order to adjust for slight phase differences between the optical paths resulting from construction inaccuracies. To balance the optical paths of the optical element of FIG. 1, an input is supplied to guide I and the voltage applied to trimmer electrode 36 adjusted such that the light beams arriving in plane P4 from guides bc and ad are in-phase. Next, an input is supplied to guide II and the voltage to electrode 34 adjusted to provide in phase signals in plane P4. Finally, inputs are supplied to both input guides I and II and the voltage to electrode 32 adjusted for a zero phase difference between the light beams in plane P4. This serves to balance the optical paths through the element to compensate for small mismatches in optical lengths. Once the path lengths are balanced, the voltages to the trimmer electrodes 32-36 may thereafter be fixed.

As previously stated, the dimensions of all waveguide paths are selected such that only the lowest-order mode propagates, except in couplers 14 and 16 as will be explained hereinafter.

Power dividers 10 and 12 and power combiners 20, 22, 26 and 28 are simply branching waveguides having an adiabatic taper such that there is no power conversion between lowerorder propagating modes in the waveguides and high-order modes. Such branching waveguides are well known in the art. Passive crossovers 18 and 24 are devices which permit optical waveguides laying in the same plane to cross each other, without any energy being coupled to the crossing guide. For example, in passive coupler 18 energy propagating in guide b continues to propagate in guide b without any energy being coupled to guide c. Passive optical crossovers suitable for use in the optical element of FIG. 1 are disclosed in U.S. Pat. No. 4,130,342 to McMahon.

Switch 30 is essentially a single-pole, single-throw switch which permits light energy propagating in guide IV to be coupled into guide f in order to perform the negation logic operations. Switches suitable for this purpose are disclosed in U.S. Pat. Nos. 3,995,311 to Taylor and 4,070,092 to Burns.

Figure 2:
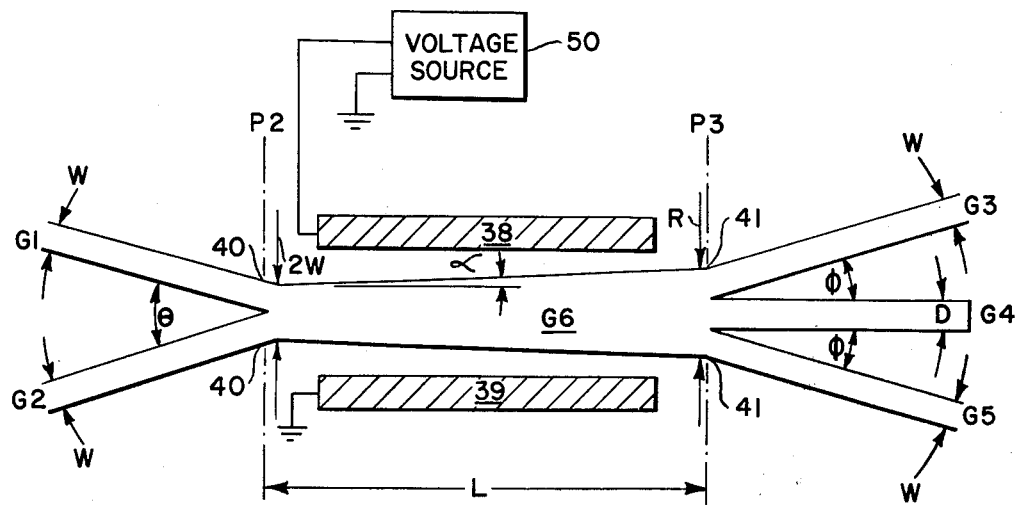
FIG. 2 illustrates the details of the passive crosschannel single-mode to single-mode couplers of FIG. 1.

Referring now to FIG. 2, there are illustrated the details of the contruction of the cross-channel single-mode to single-mode couplers 14 and 16. The couplers are provided with two single-mode input waveguides G1 and G2 which converge at plane P2. Three single-mode output waveguides G3, G4 and G5 are provided as a waveguide branch at plane P3. Connecting the input waveguides with the output waveguides between planes P2 and P3, is a tapered waveguide section G6. Input waveguides G1 and G2 and output waveguides G3 and G5 are provided with a width W such that they propagate only the lowest-order optical mode. At the intersection of input guides G1 and G2 in plane P2, guide G6 has a width of 2W, which is capable of supporting the lower-order mode and the first-order, asymmetric propagating mode. Guide G6 is provided with an adiabatic taper angle, $\alpha$, over its length L. At plane P3 where guide G6 branches into output guides G3, G4 and G5, guide G6 has a width $R=2W+D$, which is slightly larger than 3W. Guide G4 which also supports only the lowest-order mode, is provided with a width D which is approximately 30% larger than the width W of the singlemode guides and is terminated to form a non-reflecting waveguide stub.

Single-mode light energy propagating in input guides G1 and G2 is converted either to a zero-order mode, a firstorder mode, or both, in guide G6 at plane P2, depending upon the relative phase difference between the light beams in guides G1 and G2. The angle $\theta$ of intersection between guides G1 and G2 is very small and the outer edges of guides G1 and G2 are provided with a slight curvature 40—40 at their intersection in plane P2, in order to efficiently convert the energy propagating in the input guides into only the zero-order or first-order modes in guide G6. The taper angle $\alpha$ of guide G6 is also made very small to prevent the energy propagating in guide G6 from being converted to higherorder modes. This requirement is satisfied if the change in width of guide G6 per unit length is made much less than the wavelength of the light. A typical value for the taper angle would be $\alpha=0.1°$.

Energy propagating in the lower-order mode ($TE_{00}$ or $TM_{00}$) in guide G6 tends to be concentrated in the center of the guide. Therefore, most of the light will exit guide G6 at plane P3 into guide G4. Similarly, energy propagating in the first-order mode ($TE_{01}$ or $TM_{01}$) tends to be concentrated near the sides of the guide and will exit guide G6 in output guides G3 and G5. By maintaining the branching angle Φ extremely small and providing slight curvatures 41—41, at the outer edges of G6 at the transition to guides G3 and G5, the output guiding structure acts as a mode converter to efficiently convert the energy propagating in guide G6 into single-mode energy propagating in one or more of the output guides. A value of Φ in the order of 0.1° is satisfactory for this purpose. A suitable value for the input angle θ in the coupler illustrated in FIg. 2 is 0.3°. It has been found that by selecting the width D of guide G4 to be approximately 30% wider than W, the mode conversion between guide G6 and the output guides G3-G5 is promoted, while G4 remains a single-mode guide.

The cross-channel coupler of FIG. 2 operates as an electrically passive, phase-sensitive waveguide switch whose outputs are a function of its inputs. The operation of the coupler can be illustrated by referring to FIG. 3. If light energy is present in either guide G1 alone or guide G2 alone, at plane P2 this energy will be converted into both lower-order mode and first-order mode energy in guide G6.

Figure 3:
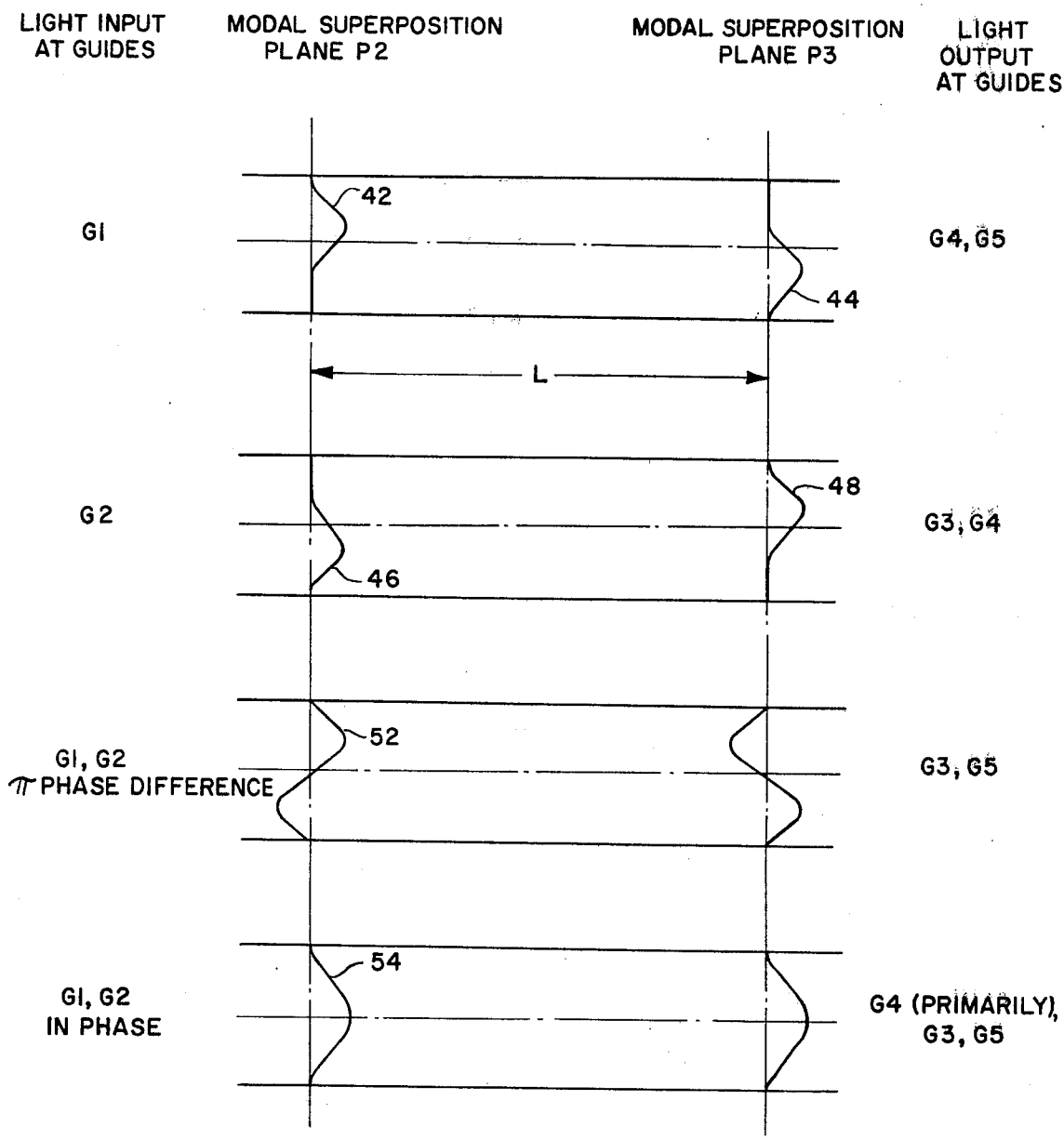
FIG. 3 illustrates the operation of the cross-channel coupler of FIG. 2.

For light input only in guide G1, the superposition of the low-order and first-order modes in plane P2 produces an energy distribution 42 in which the energy is concentrated in the upper half of G6 adjacent to G1, as illustrated in FIG. 3. This energy propagates in guide G6 toward plane P3. The optical length of guide G6 is adjusted such that the phase difference for the lower-order mode between plane P2 and P3 is zero degrees, whereas the phase difference for the first-order mode is 180 degrees. One adjustment can be made to satisfy simultaneously these two conditions because the waveguide propagation constants for the two modes are different. Thus the input energy distribution and its inverse distribution will be periodically reimaged as the two modes propagate with different phase velocities along guide G6.

In plane P3 the superposition of the two modes produces an energy distribution 44 in which the energy is concentrated in the lower half of G6 adjacent to output guide G5, as illustrated in FIG. 3. This energy distribution at plane P3 causes most of the light energy to be coupled into output guide G5, with a small amount of light being coupled into the stub G4. In effect, the light propagating in input guide G1 has been coupled to output guide G5.

Similarly, light input in guide G2 alone excites both the low-order and first-order modes in guide G6 to form an energy distribution 46 in plane P2 in which the majority of the energy is concentrated in the lower half of G6 adjacent to G2, as illustrated. This light energy propagates through guide G6 such that at plane P3 the light has an energy distribution 48 concentrated in the upper half of G6 adjacent to G3. Thus, light input in guide G2 is coupled primarily to output guide G3. Accordingly, the coupler of FIG. 2, with energy input only in guides G1 or G2, functions as a cross-channel coupler.

If light energy is input simultaneously into guides G1 and G2 with a π phase difference at plane P2, as illustrated in FIG. 3, only the first-order, asymmetrical mode 52 is excited in guide G6. This first-order mode propagates through G6 such that it arrives at plane P3 shifted in phase with respect to its phase at plane P2 by π radians. Thus, the energy is coupled primarily to output guides G3 and G5. In plane P3, the light in G3 will be in-phase with the light in G2 in plane P2 and the light in G5 in plane P3 will be in-phase with the light in G1 in plane P2. Outputs G3 and G5 will be π out-of-phase with each other, however, as were their corresponding inputs in plane P2. Thus the coupler functions as a cross-channel coupler.

If, however, the input light beams in guides G1 and G2 are in-phase, only the low-order mode 54 is excited in guide G6. The low-order mode propagates in guide G6 such that at plane P3 its phase is the same as it was in plane P2 and the energy is concentrated primarily in the center of the guide. Accordingly, most of the light energy is coupled into guide G4, and very little into output guides G3 and G5. Thus, the outputs of the cross-channel coupler of FIG. 2 are a function of the presence or absence of its input and the relative phase difference between the inputs.

In order to insure proper operation of the coupler of FIG. 2, it is necessary to adjust the optical length of guide G6 for a zero phase difference for the lowest-order mode between planes P2 and P3 and a π phase difference for the first-order, asymmetric, mode between planes P2 and P3. This is accomplished by varying the index of refraction of guide G6 such that the propagation velocities of the low-order and first-order modes cause them to arrive at plane P3 π out of phase with respect to plane P2. For this purpose, electrodes 38 and 39 are provided disposed adjacent to and on either side of guide G6. Electrode 39 is grounded and electrode 38 is connected to a variable voltage source 50, which produces an electric potential between the two electrodes. This electric potential causes an electric field to be produced which changes the index of refraction of the electro-optic material of guide G6. By adjusting the voltage source it is possible to adjust the index of refraction of guide G6 to produce the required phase difference. Once voltage source 50 is adjusted to produce the required phase differences between planes P2 and P3, it is thereafter fixed. Electrodes 38 and 39 function as trimmer electrodes in the same manner as electrodes 32, 34 and 36, which are used to balance the optical lengths of the various paths of the optical element of FIG. 1.

Figure 4:
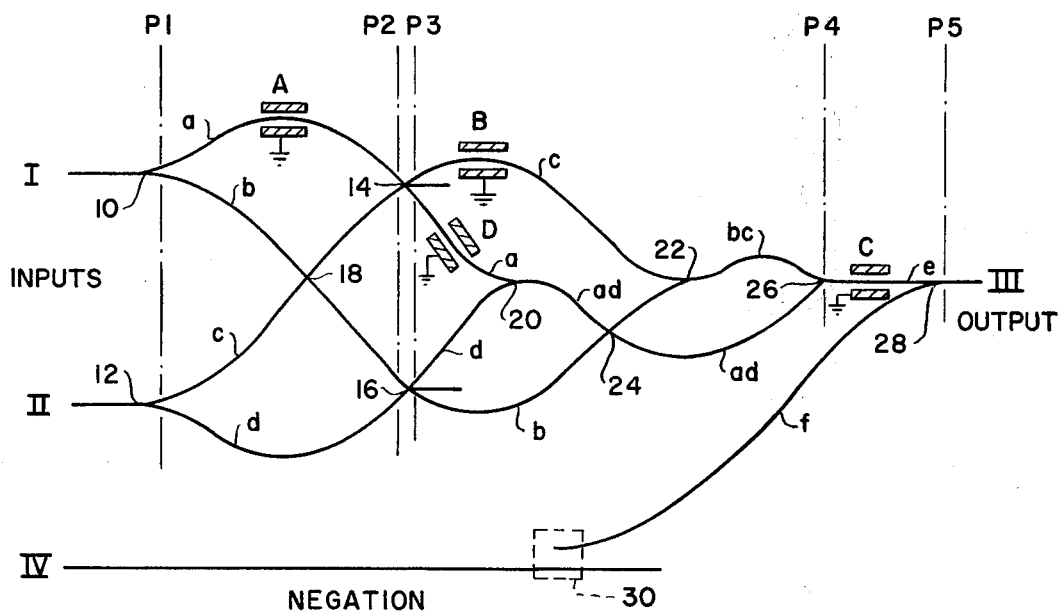
FIG. 4 is a schematic representation of the optical logic element of FIG. 1.

FIG. 4 is a schematic representation of the variable integrated optical logic element of FIG. 1 which is useful in explaining its operation. As previously mentioned, by applying voltages to control electrodes A-D or combinations thereof, the six basic binary logic operations AND, OR, EXCLUSIVE OR, NAND, NOR and EXCLUSIVE NOR can be performed. Switch 30, guide f and power combiner 28 are used only for the negation operations, i.e., NAND, NOR and EXCLUSIVE NOR. Accordingly, if these operations are not desired, it is possible to omit switch 30, guide f and power combiner 28, and take the output of the logic element from waveguide e.

To illustrate the operation of the optical logic element, consider the binary AND operation. Switch 30 is in an open state so that no light is present in guide f. To perform the AND operation, control electrodes A, B, and C, are activated with the apppropriate DC voltages to induce a π phase shift in the light beams propagating in the corresponding guides a, c, and e. As previously described, the resulting electric fields between pairs of electrodes cause the refractive indices of the paths to change due to the electro-optic effect, and permits the optical length of the paths to be varied. It is further assumed that the input light beams in I and II are coherent, in-phase and equal amplitude.

With light simultaneously present in input guides I and II, no light propagates in guides d and b beyond crosscoupler 16 because the light propagates into the central stub, as previously described in connection with FIG. 2. However, because of the phase shift induced in guide a by the voltage on control electrode A, light in guides a and c arrives out-of-phase at the input of crosscoupler 14 in plane P2. As previously described, the light is coupled out of cross-coupler 14 into guides a and c out-of-phase in plane P3. Since no light is present in guides b and d, the light in guides a and c propagates into guides ad and bc, respectively, to plane P4 and power combiner 26. However, control electrode B causes a phase shift in the light propagating in guide c so that the light arrives at 3dB power combiner 26 in-phase with the light from guide a, so that the two light beams add. The light exiting power combiner 26 in plane P4 is out-of-phase with the input light on guides I and II in plane P1. Accordingly, a voltage applied to control electrode C causes a phase shift such that the light exiting on guide III is in-phase with the inputs.

With light present in guide I and no light in guide II, light in guide a is phase shifted by control electrode A and propagates through cross-coupler 14 into guide ad. Light in guide b propagates through cross-coupler 16 to guide bc, but arrives π out-of-phase with the light from guide ad at power combiner 26. No light appears in output guide III because the out-of-phase beams excite the first-order mode of propagation in the adiabatic taper of the combiner 26. Since the single-mode output guide from the taper propagates only the lowest-order mode, the first-order mode is cut-off and radiates away.

With light present in guide II and no light present in guide I, light in guide d propagates through cross-coupler 16 and power combiner 20 into guide ad. Light in guide c propagates through cross-coupler 14 where it is phase shifted by control electrode B relative to the light propagating in guide ad. The light in guide c propagates through power combiner 22 into guide bc where it arrives at power combiner 26 out-of-phase with the light in guide ad. Thus, no light propagates in output guide III as described above.

Obviously, with no light input in either guide I or II, no light appears in output guide III. Thus, with control electrodes A, B and C activated, the optical logic element functions as an optical logic AND gate with its output inphase with its inputs.

In similar fashion, the other binary operations can easily be verified by reference to the following table, which presents the input conditions and control electrode activation required to perform the six basic binary operations. The table assumes lossless operation and that the inputs in guides I and II are coherent, in-phase, and of equal amplitude. Furthermore, it is assumed that the input in guide IV is coherent and in-phase with the inputs in guides I and II and has an amplitude equal to the amplitudes of the logic gate outputs in guide e.

TABLE

| Logic Operation | Electrodes | Optical Inputs I | Optical Inputs II | Optical Optical III |
|---|---|---|---|---|
| Switch 30 Open | | | | |
| AND | A, B, C | 0 | 0 | 0 |
| | | 1 | 0 | 0 |
| OR | A, D | 0 | 1 | 0 |
| | | 1 | 1 | 1 |
| | | 0 | 0 | 0 |
| | | 0 | 1 | 1 |
| | | 1 | 0 | 1 |
| | | 1 | 1 | 1 |
| EXCLUSIVE OR | None | 0 | 0 | 0 |
| | | 1 | 0 | 1 |
| | | 0 | 1 | 1 |
| | | 1 | 1 | 0 |
| Switch 30 Closed | | | | |
| NAND | A, B | 0 | 0 | 1 |
| | | 0 | 1 | 1 |
| | | 1 | 0 | 1 |
| | | 1 | 1 | 0 |
| NOR | A, C, D | 0 | 0 | 1 |
| | | 0 | 1 | 0 |
| | | 1 | 0 | 0 |
| | | 1 | 1 | 0 |
| EXCLUSIVE NOR | C | 0 | 0 | 1 |
| | | 0 | 1 | 0 |
| | | 1 | 0 | 0 |
| | | 1 | 1 | 1 |

Note that light undergoing two π phase shifts is in-phase with light which has not been phase shifted, and that the outputs for all binary operations are in-phase with the inputs. Furthermore, the "1" and "0" in the above table refer to logic levels. As is understood by those skilled in the art, a logic "1" amplitude level on the inputs will not, in general, equal a logic "1" amplitude level on the output. Finally, it should be noted that the non-zero output amplitudes are all equal to each other when the optical logic element operation is not lossless, as would occur in practice. This results from device symmetry, under the assumption of uniform waveguide loss and equivalent performance of both cross-couplers, and all 3dB power dividers and combiners.

While the foregoing has been with reference to a particular embodiment, it will be appreciated by those skilled in the art that numerous variations are possible without departing from the spirit and the intent of the invention. For example, while the foregoing embodiment was described with reference to electro-optic materials, the invention may equally as well be implemented using acousto-optic or magneto-optic materials in which it is possible to control the phase shift applied to optical beams propagating through the waveguides.

What is claimed is:

1. An optical logic element comprising:

Two or more single-mode input optical waveguides for inputting lowest order single-mode optical energy;

a single-mode output optical waveguide for outputting lowest order single-mode optical energy representative of a logic operation performed on said input optical energy;

a plurality of single-mode optical waveguide paths of equal optical lengths interconnecting said input and output optical waveguides, said paths including means for switching light energy in certain of said paths to certain other of said paths; and means for varying the optical length of predetermined ones of said paths such that the phase of the light energy propagating in said predetermined paths may be shifted relative to the phase of the light energy propagating in other of said paths.

2. The optical element of claim 1 wherein the logic operation performed by the optical element is a function of the phase shifts applied to the light energy propagating in said paths.

3. The optical element of claim 2 wherein said means for varying the optical lengths of said paths includes means for independently varying the optical lengths of said paths such that the optical element can be controlled to operate, alternatively, as an AND, OR, EXCLUSIVE OR, NAND, NOR or EXCLUSIVE NOR logic gate.

4. The optical element of claim 1 wherein said means for varying the optical length of predetermined ones of said paths includes means for varying the index of refraction of said paths, thereby varying the velocity of the optical energy propagating therein.

5. The optical element of claim 4 wherein said optical element is formed on a substrate of electro-optic material and said means for varying the index of refraction of said paths comprises means for applying an electric field to a portion of the length of said paths over which the index of refraction is to be varied.

6. The optical element of claim 1 further comprising balancing means for adjusting the lengths of said waveguide paths to compensate for differences in optical lengths resulting from fabrication variances.

7. The optical element of claim 6 wherein said optical element is constructed from electro-optic material and said balancing means includes means for applying electric fields to said paths to vary their index of refraction in order to compensate for differences in the velocity of propagation of the optical energy therein.

8. The optical element of claim 1 wherein said plurality of waveguide paths form a group of parallel and series equalarm interferometers and said logic operation performed by the optical element is the result of constructive and destructive interference between the light energy propagating in said waveguide paths.

9. The optical element of claim 1 wherein said switching means comprise a passive, phase-sensitive optical coupler, the outputs of which are a function of the inputs to said coupler.

10. The optical element of claim 9 wherein said phasesensitive optical coupler comprises:
a multi-mode tapered optical waveguide section for propagating zero-order and first-order optical energy;
a pair of single-mode input optical waveguides converging at the input to said multi-mode waveguide for inputting single-mode optical energy; and
single-mode output optical waveguides diverging from the output of said multi-mode waveguide for outputting singlemode optical energy;
said multi-mode optical waveguide having an optical length such that zero-order optical energy at the output of said multi-mode waveguide is in-phase with zero-order optical energy at the input to said multi-mode waveguide, whereas first-order optical energy at the output of said multi-mode waveguide is $\pi$ out of phase with first-order optical energy at the input to said multi-mode waveguide.

11. The optical element of claim 10 wherein said singlemode output optical waveguides comprise first, second and third single-mode waveguides diverging from the output of said multi-mode waveguide, said third single-mode waveguide being a terminated waveguide section disposed between said first and second waveguides, and wherein said phase-sensitive optical coupler is characterized in that zero-order optical energy propagating in said multi-mode waveguide is coupled primarily to said third output waveguide, whereas firstorder optical energy propagating in said multi-mode waveguide is coupled primarily to said first and second output waveguides.

12. The optical element of claim 1 wherein the speed of said logic operation is limited by the pulse width of said optical energy and the propagation delay of said optical energy between the inputs and the output of the optical element.

* * * * *